United States Patent
Yasuhara

(10) Patent No.: US 7,747,863 B2
(45) Date of Patent: Jun. 29, 2010

(54) IMAGE PROCESSING APPARATUS AND ITS METHOD

(75) Inventor: Hiroshi Yasuhara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1030 days.

(21) Appl. No.: 11/199,143

(22) Filed: Aug. 9, 2005

(65) Prior Publication Data
US 2006/0031678 A1    Feb. 9, 2006

(30) Foreign Application Priority Data
Aug. 9, 2004   (JP)   .............................. 2004-232499

(51) Int. Cl.
*H04L 9/32* (2006.01)
(52) U.S. Cl. .................................... 713/176
(58) Field of Classification Search ................. 713/176
See application file for complete search history.

(56) References Cited

U.S. PATENT DOCUMENTS

| | | | | |
|---|---|---|---|---|
| 5,499,294 | A * | 3/1996 | Friedman | 713/179 |
| 6,144,744 | A * | 11/2000 | Smith et al. | 380/45 |
| 6,601,172 | B1 * | 7/2003 | Epstein | 713/178 |
| 6,873,715 | B2 * | 3/2005 | Kuo et al. | 382/119 |
| 6,934,846 | B2 * | 8/2005 | Szrek et al. | 713/180 |
| 7,114,074 | B2 * | 9/2006 | Alasia et al. | 713/176 |
| 7,194,620 | B1 * | 3/2007 | Hayes | 713/157 |
| 7,210,037 | B2 * | 4/2007 | Samar | 713/176 |
| 7,302,585 | B1 * | 11/2007 | Proudler et al. | 713/189 |
| 7,394,573 | B1 * | 7/2008 | Goldberg et al. | 358/3.28 |
| 2002/0078355 | A1 * | 6/2002 | Samar | 713/176 |
| 2002/0174338 | A1 * | 11/2002 | Tomita et al. | 713/176 |
| 2003/0056107 | A1 * | 3/2003 | Cammack et al. | 713/189 |
| 2003/0218061 | A1 * | 11/2003 | Filatov | 235/379 |
| 2005/0010767 | A1 * | 1/2005 | Craft | 713/168 |
| 2006/0036864 | A1 * | 2/2006 | Parulski et al. | 713/176 |

FOREIGN PATENT DOCUMENTS

| | | |
|---|---|---|
| JP | 08-139717 | 5/1996 |
| JP | 2002-281475 | 9/2002 |
| JP | 2003-333037 | 11/2003 |

* cited by examiner

*Primary Examiner*—Kambiz Zand
*Assistant Examiner*—Teshome Hailu
(74) *Attorney, Agent, or Firm*—Fitzpatrick, Cella, Harper & Scinto

(57) ABSTRACT

A method for unified management of secret key using a signature server is known, however, there is a danger that a hash value and/or signature data are altered in the middle of communication channel between a multi-function device and the signature server. Accordingly, the feature amount of the image data is calculated, and the feature amount is transmitted to a signature server. Then electronic signature data generated from the feature amount by the signature server is received, the received electronic signature data is verified using the feature amount, and if the result of verification indicates that the electronic signature data is proper for the image data, image data with electronic signature, where electronic signature data is added to the image data, is generated.

7 Claims, 7 Drawing Sheets

IMAGE PROCESSING APPARATUS AND ITS METHOD

FIELD OF THE INVENTION

The present invention relates to an image processing apparatus and its method, and more particularly, to image processing for generating image data with electronic-signature data for guarantee of data validity (alteration and guarantee of source).

BACKGROUND OF THE INVENTION

In recent years, the Internet and electronized documents are widely used, and images are frequently converted to or generated as electronic data. However, there is a danger that the electronic data are altered in the progress of conversion via a network or storage into a storage medium. To prevent such alteration, an electronic signature technique has been developed.

According to the electronic signature technique, a sender A obtains a hash value (HV) of electronic data to be transmitted using a hash function, then encrypts the obtained HV with a secret key, then attaches the HV to the electronic data as an electronic signature value, and transmits the electronic data with the electronic signature value to a receiver B. Further, when the electronic signature value is transmitted to an authentication bureau C, the authentication bureau C transmits, the electronic signature value and a certificate of the sender A issued by the authentication bureau C, and a public key, as a set, to the receiver B.

The receiver B obtains the HV of the electronic data received from the sender A using the hash function, further, obtains the HV by decoding the electronic signature value received from the authentication bureau C with the received public key. Then the receiver B compares the two HV values and determines whether or not the electronic data has been altered.

In the above technique, to protect the secret key of the sender A from others, it is desirable that duplication of secret key is impossible. However, in a case where a signatory is an organization or company, signature may be made by plural persons in plural places. If duplication of secret key is impossible, it is impossible for persons belonging to the organization or company to hold the same secret key. For this reason, in a case where such organization or company is a signatory, secret keys are generated for the persons and places to sign, and managed by the organization or company.

To verify a signature, it is necessary to obtain a public key corresponding to a secret key used in the signature. Regardless of signatory, i.e., an organization, a company or a person, when plural secret keys are managed, a receiver manages plural public keys and uses a public key corresponding to received signature data, as in the case of management of plural secret keys.

To simplify the key management, known is a method for electronic signature processing for unified secret key management by providing an electronic signature server.

Japanese Patent Application Laid-Open JP 2002-281475 discloses a method for generating an image-data electronic signature via a signature server. An image sensing apparatus transmits image data to a client, encrypts an HV of the image data and transmits the data to a signature server. The signature server decodes the HV, performs electronic signature processing and transmits signature data to the client. According to the method, as a secret key utilized in the electronic signature is managed by the signature server, the secret key can be unified.

However, in the above electronic signature generating method, as the sender of image data and that of signature data are different, it is necessary for the receiver (client) to associate the image data with the signature data, received from the different senders. If some error occurs in the management and discordance occurs between the signature data and the image data, verification of signature of image data cannot be correctly performed.

Further, in the electronic signature generating method, the signature server decodes the encrypted HV of image data, encrypts the HV with the secret key in the signature server and transmits the HV to the client. If the signature data itself is altered on a communication channel, the client cannot correctly perform signature verification. That is, as an verification result, it is determined that the image data has altered although the signature data has been altered.

As described above, in the method utilizing a signature server for unified management of secret key disclosed in JP 2002-281475, as image data and signature data are sent to a client from different senders, the receiver side takes a lot of trouble with association between the two data.

Further, scan data can be transmitted to a designated destination by using a multi-function equipment provided in a convenience store, a public place or the like. In this case, it is significant to transmit correct data (unaltered data). For this purpose, known is a method for performing encryption and electronic signature processing on scan data using a secret key held in a device or an IC card and transmitting the image data with electronic signature.

However, as the use of secret key is closed in the device and it must not exit to the outside, it is necessary to hold different secret keys in devices or IC cards. That is, even in the same type multi-function equipments belonging to the same convenience store group, as the secret keys are different in different shops or devices, it is necessary for a receiver to obtain a public key corresponding to the shop or device. Further, as it is necessary for a person who manages the secret keys to hold a lot of keys, the management cost is increased.

SUMMARY OF THE INVENTION

According to one aspect of the present invention, the foregoing object is attained by providing calculating a feature amount of image data, transmitting the feature amount to a signature server, receiving electronic signature data generated from the feature amount by the signature server, verifying the received electronic signature data using the feature amount, and if the result of verification indicates that the electronic signature data is proper for the image data, generating image data with electronic signature where the electronic signature data is added to the image data.

According to the present invention, it is possible to reduce the trouble of association between image data and signature data, and reduce the load of key management, and further, verify the validity of signature data.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
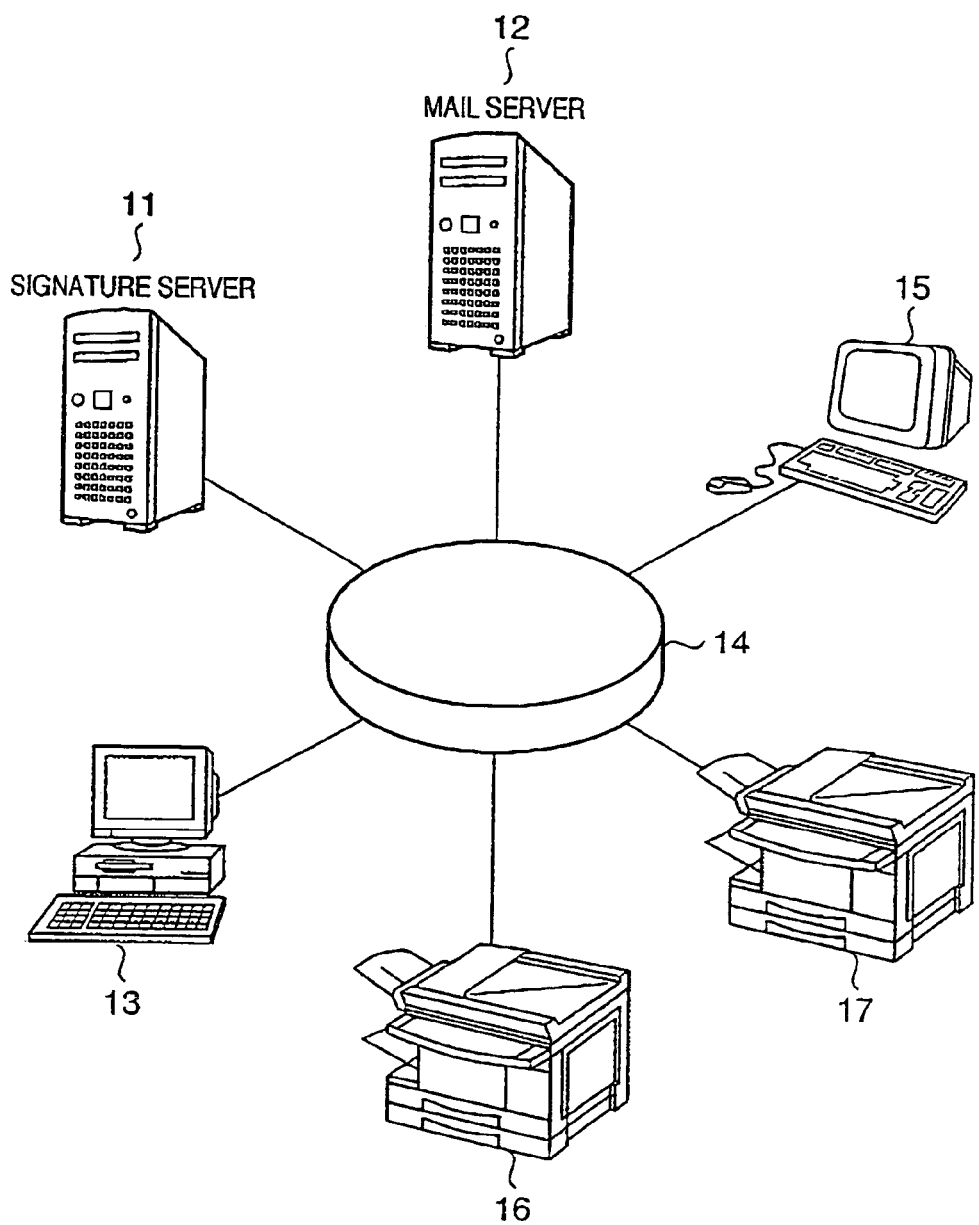
FIG. 1 illustrates connection relation among multi-function devices, a signature server, clients and the like, according to an embodiment of the present invention.

FIG. 1 illustrates connection relation among multi-function devices, a signature server, clients and the like, according to an embodiment of the present invention.

A signature server 11, a mail server 12, clients 13 and 15, and multi-function devices 16 and 17 are interconnected via a network 14. For example, image data with signature transmitted from the multi-function device 17 is received by the client 15 via the mail server 12. Further, in signature processing according to the embodiment, the multi-function device 17 transmits a feature amount of image data to the signature sever 11, and the signature server 11 transmits generated signature data to the multi-function device 17.

Figure 2:
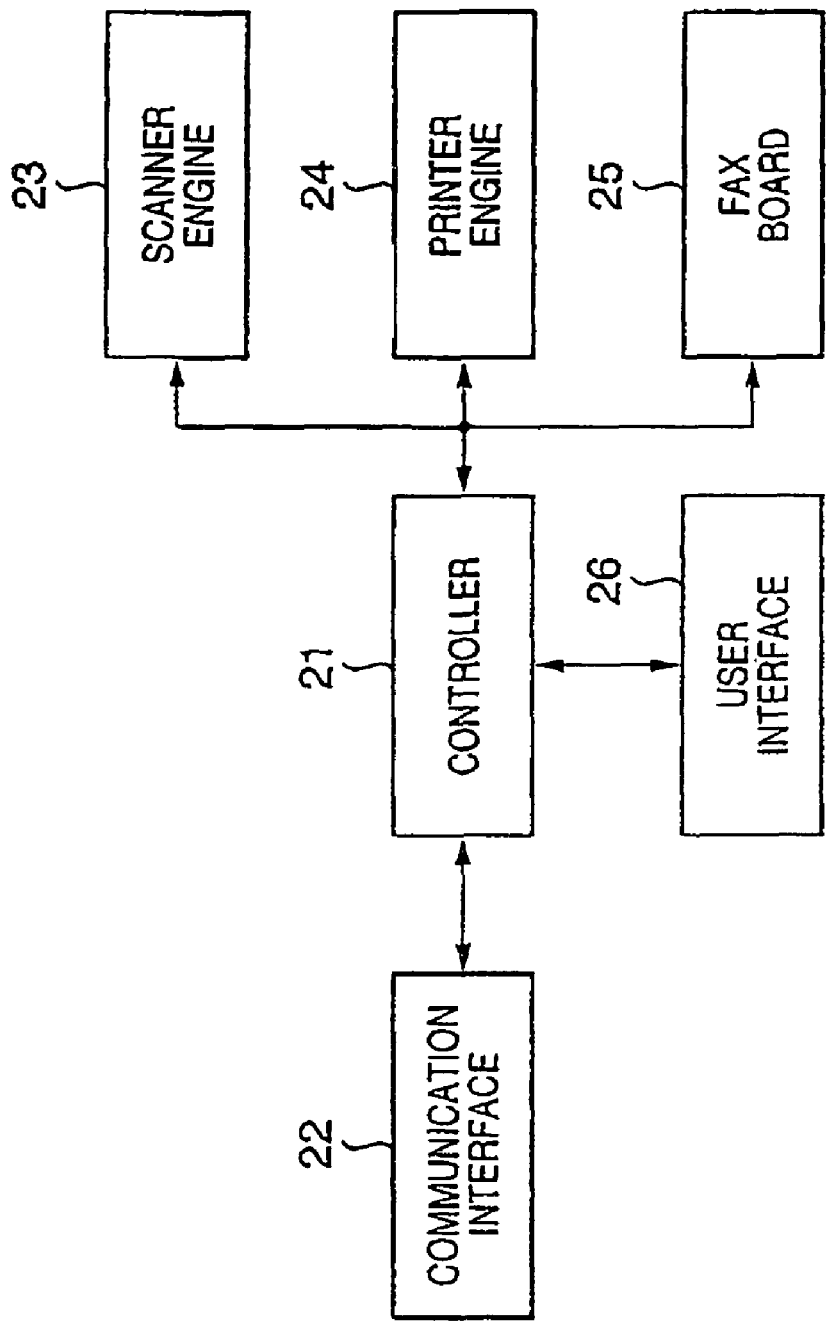
FIG. 2 is a block diagram showing the functional construction of the multi-function device.

FIG. 2 is a block diagram showing the functional construction of the multi-function devices 16 and 17.

A controller 21 controls the multi-function device, and communicates with the outside via a communication interface 22. The communication interface 22 is a network interface such as Ethernet², a serial bus interface such as USB (Universal Serial Bus) or IEEE 1394, an infrared communication, or a radio communication interface.

The controller 21 controls a scanner engine 23, a printer engine 24, and a FAX (facsimile) board 25.

The printer engine 24 is a laser-beam printer, an ink-jet printer, or other type of printer. The FAX board 25 realizes a facsimile function by communication control upon facsimile transmission/reception of image.

A user interface 26, having e.g. an LCD and a keyboard, displays information received from the controller 21 on the LCD, and sends an instruction inputted by a user with the keyboard to the controller 21.

The controller 21 receives a print job via the communication interface 22, then selects the printer engine 24 to execute the received print job.

Further, when a scan job is designated via the communication interface 22 or the user interface 26, the controller 21 selects the scanner engine 23, to execute the scan job to obtain an image of a document placed on a document plate and transmit the obtained image to a designated client or the like via the communication interface 22 or the user interface 26. Further, when an image transmission job is designated via the communication interface 22, the controller 21 executes the transmission job to transmit a received image to a designated client or the like.

Note that the transmission job can be designated from the clients 13 and 15 and other multi-function devices. Further, the format of transmission image data can be designated via the communication interface 22 or the user interface 26. For example, PDP (Portable Document Format), TIFF (Tagged-Image File Format) and JPEG (Joint Photographic Image Experts Group) can be designated.

Further, when a copy job is designated via the user interface 26, the controller 21 selects the printer engine 24 and the scanner engine 23 to duplicate an image of document placed on the document plate.

Further, when a facsimile transmission job is designated via the communication interface 22 or the user interface 26, the controller 21 selects the FAX board 25 to execute the facsimile transmission job to facsimile-transmit an image received via the communication interface 22 or a document image obtained by the scanner engine 23. Further, when an image has been received via the FAX board 25, the controller 21 causes the printer engine 24 to print-output the received image.

Further, the controller 21 is capable of detection of feature amount of image data generated by a scan job, transmission of feature amount via the communication interface 22 to the signature server 11, and reception and signature verification of signature data.

Figure 3:
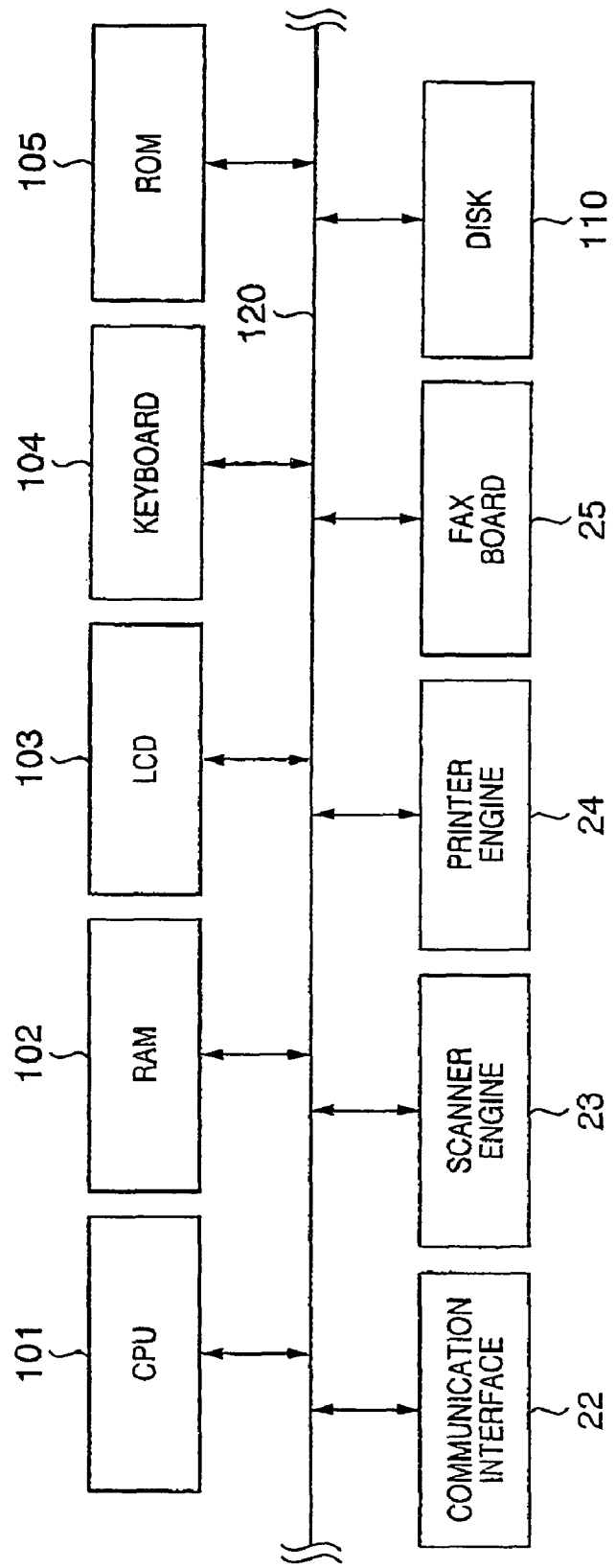
FIG. 3 is a block diagram showing the hardware construction of the multi-function device.

FIG. 3 is a block diagram showing the hardware construction of the multi-function devices 16 and 17.

The controller 21 has a CPU 101 which performs processing programs to be described later, stored in a ROM 105 and a hard disk (DISK) 110, with a RAM 102 as a work memory, and controls other units via a system bus 120. The CPU 101 temporarily stores attribute information indicating the function and state of a job processed by the multi-function device, job data as the subject of output, a received image and the like, into the hard disk 110. Further, the user interface 26 has an LCD 103 and a keyboard 104.

Figure 4:
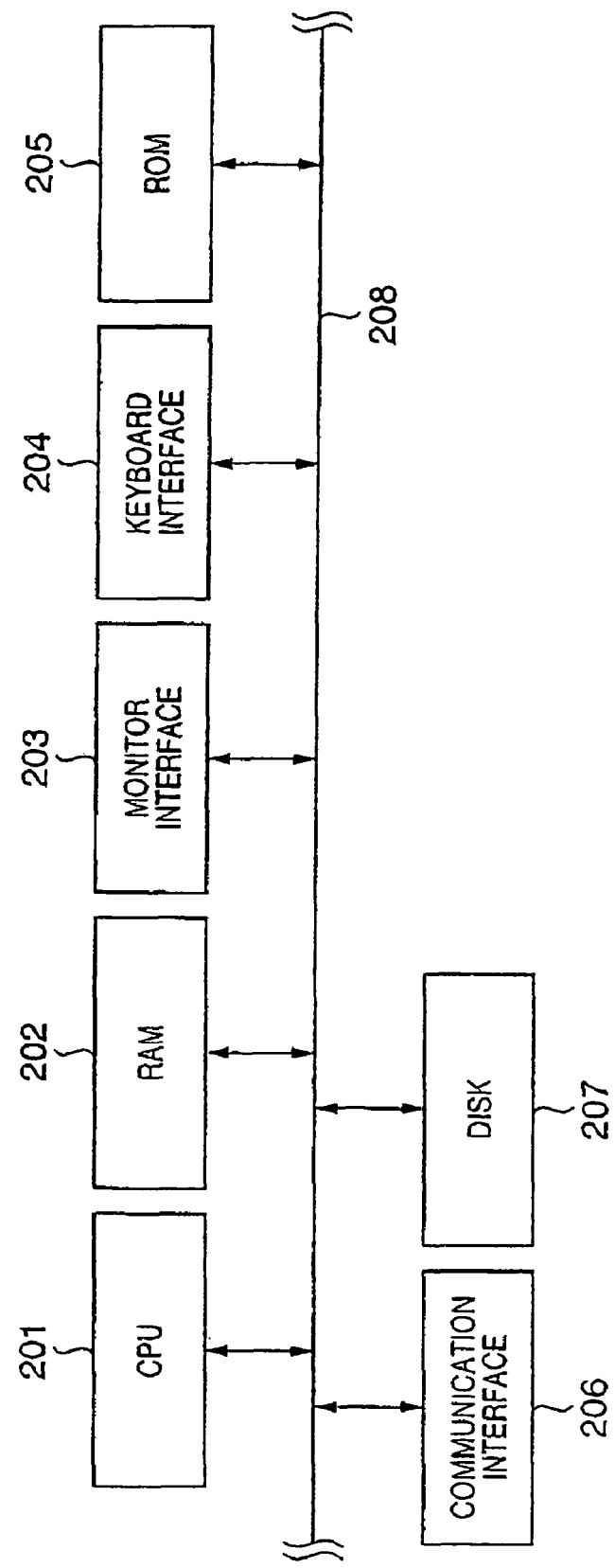
FIG. 4 is a block diagram showing the hardware construction of the signature server, a mail server and the client.

FIG. 4 is a block diagram showing the hardware construction of the signature server 11, the mail server 12 and the clients 13 and 15.

A CPU 201 performs programs of processings to be described later, stored in a ROM 205 and a hard disk 207, with a RAM 202 as a work memory, and controls other units via a system bus 208. Further, the CPU 201 displays a user interface, a processing state and a processing result on a monitor such as an LCD via a monitor interface 203. Further, the CPU 201 receives the user's instruction via a pointing device such as a keyboard or a mouse connected to a keyboard interface 204. Further, the CPU 201 temporarily stores attribute information indicating the function and status of a job processed by the multi-function devices 16 and 17, job data as the subject of output, and the like, into the hard disk 207. Further, the CPU 201 communicates with an external device via the communication interface 206.

Note that the signature server 11 performs signature data generation processing to be described later. The mail server 12 performs processing as an electronic mail server based on a protocol such as an SMTP (Simple Mail Transfer Protocol), POP (Post Office Protocol) or an IMAP (Internet Message Access Protocol). The clients 13 and 15 perform the above-described print job, the scan job and the transmission job by the multi-function devices 16 and 17, and perform processing to receive an electronic mail from the mail server 12.

Figure 5:
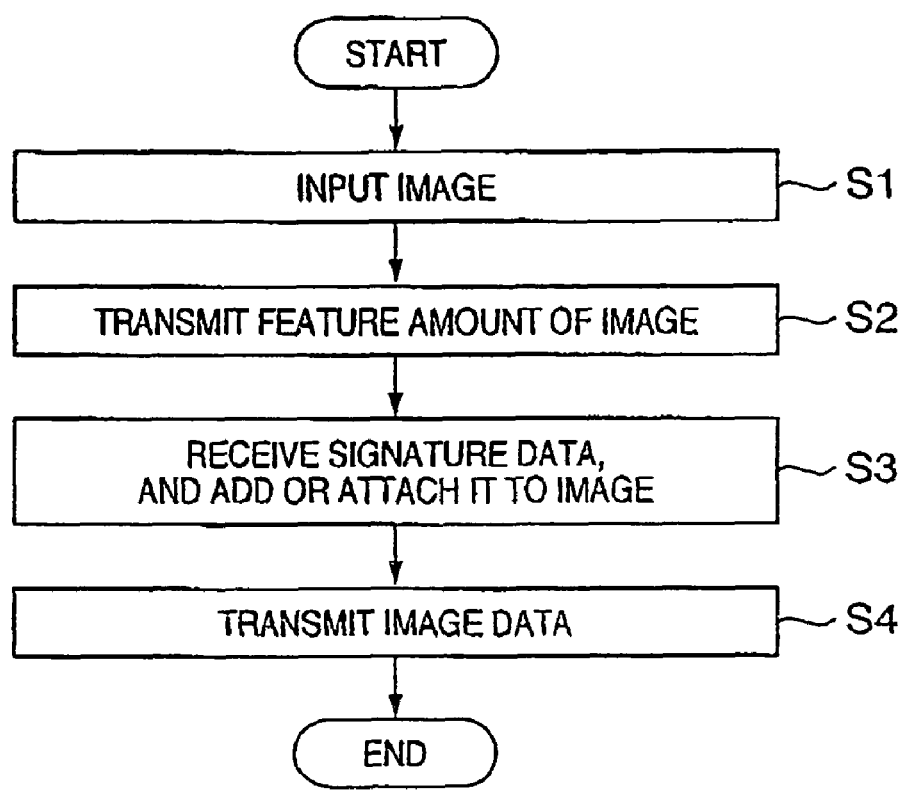
FIG. 5 is a flowchart showing processing performed by a controller of the multi-function device.

FIG. 5 is a flowchart showing processing performed by the controller 21 of the multi-function devices 16 and 17.

The controller 21 performs image input processing by reading a document image by the scanner engine 23 or receiving image data via the communication interface 22 (S1).

Next, the controller 21 calculates the feature amount of the input image data, and transmits the calculated feature amount via the communication interface 22 to the signature server 11 (S2). Then, the controller 21 receives signature data generated by the signature server 11, decodes the received signature data using a public key, corresponding to a secret key held in the signature server 11, stored in the hard disk 110 or the like. Then the controller 21 compares the decoded signature data with the feature amount of the image data. If it is determined that they correspond with each other, the controller associates the signature data with the image data (S3). Note that the communication with the signature server 11 is not particularly limited, however, in the case of communication between the multi-function devices 16 and 17, and the signature server 11, it may be arranged such that information can be kept secret by SSL (Secure Socket Layer) or the like.

Next, the controller 21 transmits the image data with the signature data as an electronic mall via the communication interface 22 to the mail server 12 (S4). The mail server 22 transmits the received electronic mail to the client 13 or 15 as a designated destination.

Note that the image data with the signature data may be transmitted to the client 13 or 15 via the network not as electronic mail but as other form of data.

Figure 6:
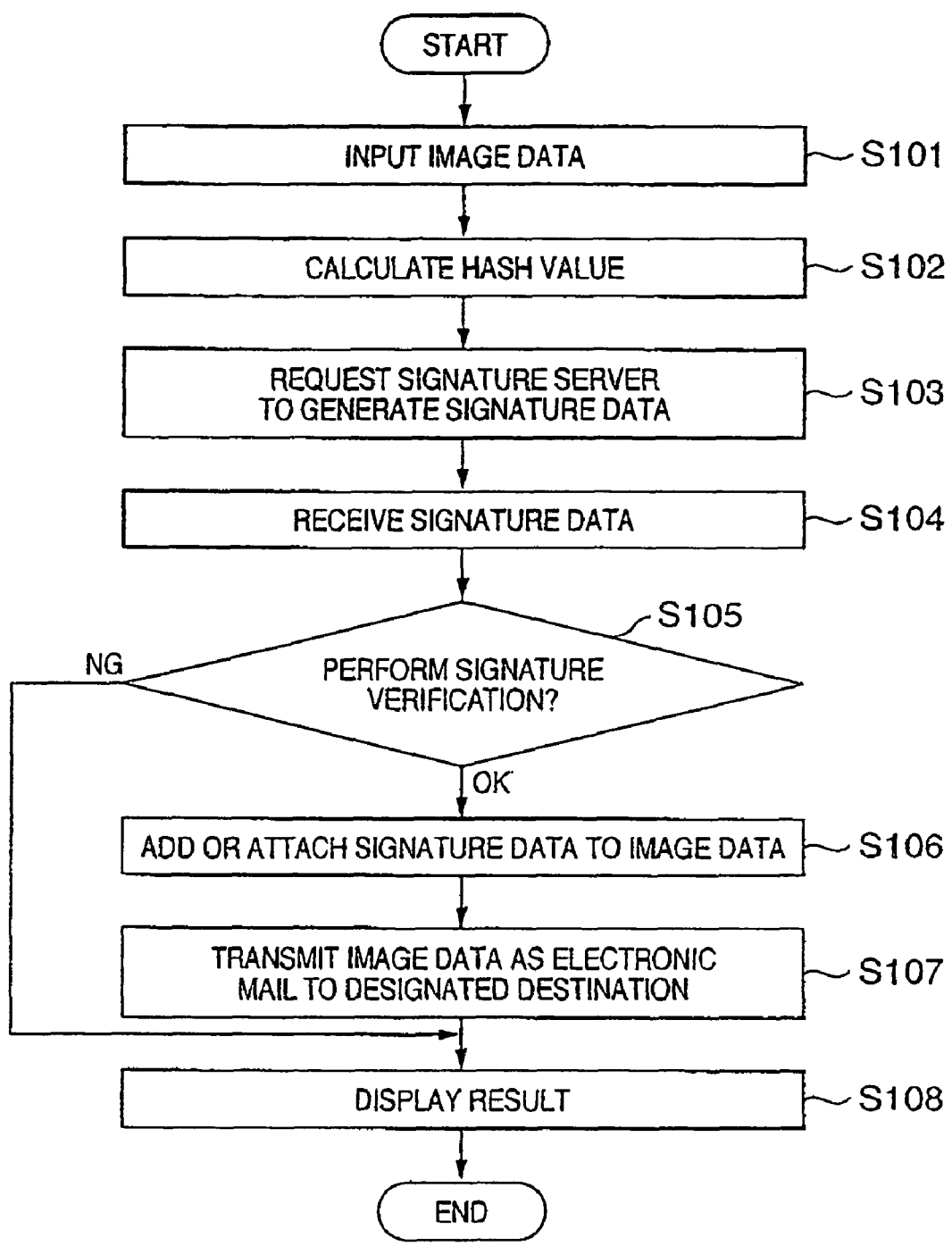
FIG. 6 is a flowchart showing the details of the processing performed by the controller of the multi-function device.

FIG. 6 is a flowchart showing the details of the processing performed by the controller 21 of the multi-function devices 16 and 17.

When the scan job or transmission job has been designated via the user interface 26 or the communication interface 22, the controller 21 performs the above-described image input processing (S101), calculates a hash value (HV) as the feature amount of the input image data (S102), and transmits the calculated HV, with a signature-data generation request, to the signature server 11 (S103). Then the controller 21 receives signature data returned from the signature server 11 (S104), decodes the received signature data and compares the signature data with the HV, thereby verifies the signature data (S105).

Next, if it is determined that the compared two data do not correspond with each other, the controller 21 determines that the signature data has been altered, and displays an error message on the user interface 26 or notifies it to a client or the like that designated the transmission job (S108). Further, if it is determined that the compared two data correspond with each other (the signature verification has been normally performed), the controller 21 adds or attaches the signature data to the image data thereby generates image data with signature data (S106), transmits the image data with signature data as an electronic mail to a designated transmission destination (S107), and displays information on the transmission on the user interface 26 or notifies it to the client or the like that designated the transmission job (S108).

Figure 7:
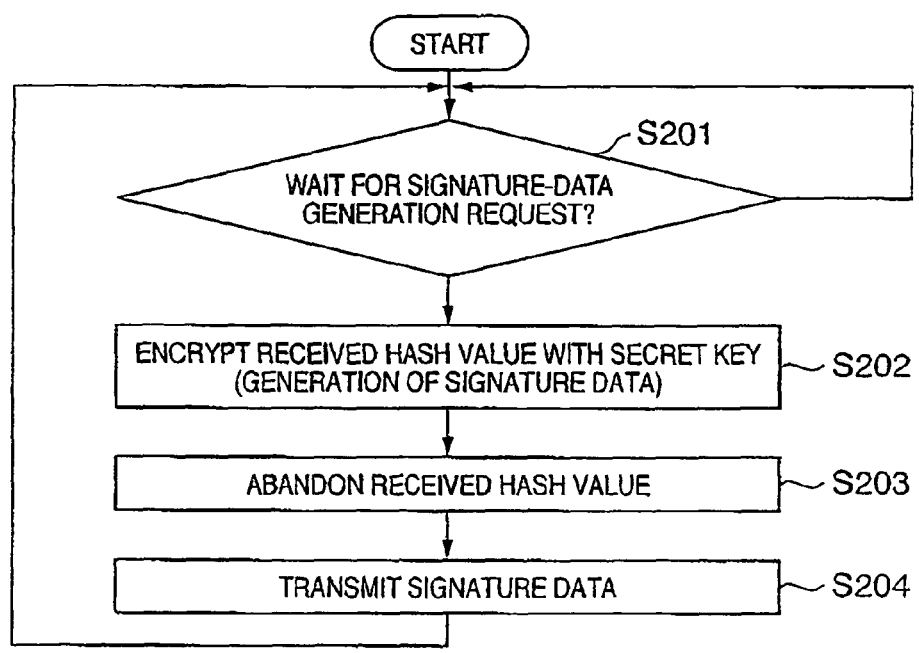
FIG. 7 is a flowchart showing electronic-signature data generation processing performed by the signature server.

FIG. 7 is a flowchart showing electronic-signature data generation processing performed by the signature server 11.

The signature server 11 waits for the signature data generation request (S201), and when the request has been received, encrypts an HV received with the request using a secret key held inside, thereby generates signature data (S202). The signature server 11 abandons the received HV (S203), and transmits the generated signature data, with a response to the received request, to a request originator (5204). Thereafter, the process returns to step S201.

In this manner, according to the present embodiment, as the secret key utilized in generation of signature is managed by the signature server 11, the secret key is held only by the signature server 11. The number of keys can be reduced, and the trouble of key management can be reduced.

As the hash value is generated by the multi-function devices 16 and 17 and signature is made by the signature server 11, scan data itself does not flow on the network 14. Accordingly, the above communication is secure in comparison with the conventional case where all the signature-related operations are performed in the signature server 11.

As the multi-function devices 16 and 17 transmit image data with signature at once to the clients 13, 15 or the like, the clients 13, 15 or the like easily recognizes the association between the signature data and the image data. Thus the trouble of management of association between signature data and image data can be reduced.

Before the multi-function devices 16 and 17 transmit image data with electronic signature to the clients 13, 15 and the like, the signature data is verified, and only if the result of verification is successful, the multi-function devices 16 and 17 transmit the image data with electronic signature. Accordingly, this prevents alteration of hash value and/or signature data in the middle of the communication channel between the multi-function devices 16 and 17, and the signature server 11.

Other Embodiment

The present invention is not limited to the above embodiment and various changes and modifications can be made within the spirit and scope of the present invention. Therefore, to appraise the public of the scope of the present invention, the following claims are made.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

Claim of Priority

This application claims priority from Japanese Patent Application No. 2004-232499, filed on Aug. 9, 2004, which is hereby incorporated by reference herein.

What is claimed is:

1. An image processing apparatus, which is connected to a signature server via a computer network and which transmits output image data to a destination device, comprising:
   a calculator, arranged to calculate a hash value of input image data;
   a transmitter, arranged to transmit the hash value of the input image data to the signature server through the computer network;
   a receiver, arranged to receive from the signature server, via the computer network, electronic signature data which is generated by the signature server using the hash value of the input image data;
   a decoder, arranged to decode the electronic signature data received by said image processing apparatus from the signature server to obtain a hash value of the electronic signature data;
   a comparator, arranged to compare the hash value of the electronic signature data received from the signature server with the hash value of the input image data; and
   a generator, arranged to, if the comparison result of said comparator indicates that the hash value of the electronic signature data is identical to the hash value of the input image data, generate output image data with an electronic signature in which the electronic signature data is added to the input image data, and if the comparison result indicates that the hash value of the electronic signature data is not identical to the hash value of the input image data, generate no output image data with an electronic signature,
   wherein, when said generator generates output image data with an electronic signature, said transmitter transmits the output image data with an electronic signature to the destination device via the computer network.

2. The apparatus according to claim 1, wherein said decoder performs the decoding of the received electronic signature data using a public key corresponding to a private key which is used in the generation of the electronic signature data by the signature server, and said comparator compares the result of decoding with the hash value of the input image data.

3. An image processing method for an image processing apparatus that is connected to a signature server via a computer network and that transmits output image data to a destination device, comprising the steps of:
   calculating a hash value of input image data;
   transmitting the hash value of the input image data to the signature server through the computer network;
   receiving from the signature server, via the computer network, electronic signature data generated by the signature server using the hash value of the input image data;
   decoding the electronic signature data received by the image processing apparatus from the signature server to obtain a hash value of the electronic signature data;
   comparing the hash value of the electronic signature data received from the signature server with the hash value of the input image data; and
   generating, if the comparison result indicates that the hash value of the electronic signature data is identical to the hash value of the input image data, output image data with an electronic signature in which the electronic signature data is added to the input image data and if the comparison result indicates that the hash value of the electronic signature data is not identical to the has value of the input image data, generating no output image data with an electronic signature,
   wherein, when said generating step generates output image data with an electronic signature, the output image data with the electronic signature is transmitted to the destination device via the computer network.

4. The method according to claim 3, wherein the decoding is performed by decoding the received electronic signature data using a public key corresponding to a private key which is used in the generation of the electronic signature data by the signature server, and the comparing step compares the result of decoding with the hash value of the input image data.

5. A computer-readable storage medium storing a computer program for causing a computer to perform an image processing method for an image processing apparatus that is connected to a signature server via a computer network and that transmits output image data to a destination device, the method comprising the steps of:
   calculating a hash value of input image data;
   transmitting the hash value of the input image data to the signature server through the computer network;
   receiving from the signature server, via the computer network, electronic signature data generated by the signature server using the hash value of the input image data;
   decoding the electronic signature data received by the image processing apparatus from the signature server to obtain a hash value of the electronic signature data;
   comparing the hash value of the electronic signature data received from the signature server with the hash value of the input image data; and
   generating, if the comparison result indicates that the hash value of the electronic signature data is identical to the hash value of the input image data, output image data with electronic signature in which the electronic signature data is added to the input image data, and if the comparison result indicates that the hash value of the electronic signature data is not identical to the hash value of the input image data, generating no output image data with an electronic signature,
   wherein, when said generating step generates output image data with an electronic signature, the output image data with an electronic signature is transmitted to the destination device via the computer network.

6. An image processing apparatus according to claim 1, wherein said image processing apparatus is connected to a mail server via the computer network, and wherein the output image data with an electronic signature is transmitted to the destination device by sending the output image data with an electronic signature to the mail server via the computer network and transmitting it to the destination device from the mail server.

7. An image processing method according to claim 3, wherein the image processing apparatus is connected to a mail server via the computer network, and wherein the output image data with an electronic signature is transmitted to the destination device by sending the output image data with an electronic signature to the mail server via the computer network and transmitting it to the destination device from the mail server.

* * * * *